United States Patent
Loebmann et al.

[11] Patent Number: 5,958,815
[45] Date of Patent: Sep. 28, 1999

[54] METHOD OF MAKING POROUS CERAMICS OF A PB ($ZR_xTI_{1-x}$) $O_3$ COMPOUND

[75] Inventors: Peer Loebmann, Wuerzburg; Walther Glaubitt, Veitshoechheim; Jochen Fricke, Gerbrunn, all of Germany

[73] Assignee: Fraunhofer-Gesellschaft zur Foerderung der angewandten Forschung e.V., Munich, Germany

[21] Appl. No.: 08/861,134

[22] Filed: May 21, 1997

[30] Foreign Application Priority Data

Jun. 5, 1996 [DE] Germany .......................... 196 22 500

[51] Int. Cl.⁶ .................................................... C04B 35/49
[52] U.S. Cl. ...................... 501/134; 501/12; 252/62.9 PZ
[58] Field of Search ........................ 252/62.9 PZ; 301/12, 301/134

[56] References Cited

U.S. PATENT DOCUMENTS 5,143,636  9/1992  Gaucher et al. ........................... 501/12
5,443,746  8/1995  Harris et al. ............................. 501/134

FOREIGN PATENT DOCUMENTS 47-898  2/1992  European Pat. Off. .

*Primary Examiner*—Deborah Jones
*Attorney, Agent, or Firm*—Karl Hormann

[57] ABSTRACT

A method of making porous ceramics of lead titanate (PT) or lead zirconate (PZT) of a $Pb(Zr_xTi_{1-x})O_3$ compound from a gel made by mixing at least 2.5 equivalents of water based on the compound with a solution prepared from a polar solvent having complexing and chelating properties, one or more Pb(II) and PB(IV) carboxylates and at least one compound including titanium and zirconium of the general formula $M(OR)_4$ where M is titanium or zirconium and R is similar or different groups representing at least one of a straight chain, cross-linked and cyclic alkyl and alkenyl group with 1 to 10 carbon atoms, aging the resulting gel beyond its gel point, replacing the solvent in the pores of the gel by a chelating solvent, drying the resulting gel under supercritical conditions and tempering the resulting aerogel.

13 Claims, No Drawings

METHOD OF MAKING POROUS CERAMICS OF A PB ($ZR_xTI_{1-x}$) $O_3$ COMPOUND

BACKGROUND OF THE INVENTION

1. Field of the Invention

The invention relates to a method of making porous lead titanate (PT) or lead zirconate (PZT) ceramics of a $Pb(Zr_xTi_{1-x})O_3$ compound where x=0 to 0.9, by using a sol-gel-process.

Solids and gases have noticeably different acoustic impedances. For that reason, conventional ultrasonic sensors and actuators made of dense ceramics and ceramic-polymer composites are suited to a limited extent only for transmitting signals in gaseous media. By comparison, porous piezoactive materials in their density and sound velocity and, hence, in their acoustic impedance are better adapted to air space by an order of magnitude.

2. The State of the Art

Two methods are known for producing such porous substances, viz., a slip casting method and an aerogel method. In the slip casting method, PZT powder is mixed with methylethyl cellulose or other binders and is isostatically cold pressed. Following a temperature treatment of up to 1,100° C., ceramic materials are obtained having porosities of about 50% (G. Galassi et al., Fourth Euro Ceramics 5 (1995), 25–32). An aerogel process is described in European Patent specification EP 0,470,898 A1, in which a ceramic gel (PZT) is produced in the presence of a solvent from lead carboxylates and titanium/zirconium alkoxides by a sol-gel process. By applying pressures and temperatures which convert the solvent into a supercritical state, a material is obtained in a porous condition as an aerogel. By calcination, crystalline ceramics of high porosity are derived therefrom. It has, however, been shown that lead carboxylates, such as, e.g., lead acetate trihydrate $(Pb(OAc)_2 \cdot 3 H_2O$ is solvated to a very limited extent only in the mentioned solvents such as methanol, ethanol, isopropanol or acetone by which the supercritical drying is then carried out. Because of the low lead and titanium/zirconium concentration it is possible to produce wet gels with difficulty only. These, however, have so filiform a skeleton structure that at supercritical drying they are almost entirely destroyed in their own solvent. Monoliths cannot be produced by the method described in EP 0,470,898 A1.

OBJECTS OF THE INVENTION

It is the task of the invention to provide a method by which stable highly porous and monolithic lead titanate (PT) or lead zirconate (PZT) ceramics may be produced. The method is to make it possible to produce highly porous materials of lead titanate and lead zirconate-titanate stoichiometry. These highly porous materials are to be such that they may be converted into a perovskite structure without destruction of the monoliths. Moreover, the zirconium proportion of the ceramic is to be variable over wide ranges. Furthermore, the method is to be practiced in a simple and cost-efficient manner and with small investment in laboratory equipment.

BRIEF SUMMARY OF THE INVENTION

In accordance with the invention, there is provided a method of making porous ceramics of the kind herein described having the following characteristics:

a solution is prepared the concentration of which, relative to $Pb(Zr_xTi_{1-x})O_3$, is at least 0.5 molar, and which contains the following components a), b) and c);

a) one or more polar solvents with complexing, chelating properties;

b) one or more Pb(II) and/or Pb(IV) carboxylates derived from substitutes or unsubstituted, monovalent or polyvalent, saturated or unsaturated, straight chain cross-linked, cyclic or aromatic carboxylic acids or hydroxy carboxylic acids having 1 to 18 carbon atoms;

c) one or more titanium and, if desired, zirconium compounds derived from general formula I;

$$M(OR)_4 \tag{I}$$

in which M is titanium or zirconium and the R groups are similar or different and represent straight chain, cross-linked or cyclic alkyl or alkenyl groups having 1 to 10 carbon atoms and which may have one or more carbonyl and/or ester and/or carboxyl functions; for hydrolytic condensation, the resulting solution is mixed with at least 2.5 equivalents of water, based on $Pb(Zr_xTi_{1-x})O_3$, if necessary in the presence of a dissolving aid and/or a catalyst;

the resulting gel is aged beyond its gel point;

the polar solvent in the pores of the gel is replaced by a non-chelating and supercritically dryable solvent of low polarity;

the resulting gel is dried under supercritical conditions;

the resulting aerogel is tempered until the complete crystallization of the desired phase.

Suitable Zr- or Ti-alcoholates (alkoxides) of formula I are those in which the R groups represent straight chain, cross-linked or cyclic alkyl groups having 1 to 10 carbon atoms, those having 2 to 6 carbon atoms being currently preferred and yielding particularly good results. Furthermore, one or more of the OR groups of general formula I are preferably derived from oxoesters, β-diketones, carboxylic acids, ketocarboxylic acids or ketoalcohols. OR groups derived from actylacetone are particularly preferred. Without any limitation of general concepts, the following are suitable Zr and Ti alcoholates: $Zr(OPr^n)_4$, $Ti(OPr^i)_4$, $ZR(OB.)_4$, $Ti(OEt)_4$, $Zr(AcAc)_2(O^iPr)_2$ or $Ti(AcAc)_2(O^iPr)2$.

In preferred embodiments of the method in accordance with the invention, Zr and Ti alcoholates are used in a molar ratio of 53:47.

The following are examples of suitable lead carboxylates: lead adipate, lead benzoate, lead citrate, lead cyclohexanebutyrate, lead formiate, lead fumarate, lead-12-hydroxy stearate, lead acetate, lead linolate, lead maleate, lead naphthenate, lead auctioned, lead oleate, lead oxalate, lead palmitate, lead phthalate, lead salicylate, lead stearate, lead succinate, lead tartrate or lead-2-hydroxy-2-methyl propionate. Lead acetates of general formula II $$Pb(O-CO-CH_3)_l mPbO \cdot nH_2O \tag{II}$$

are preferred for use in the method in accordance with the invention, where l=2 or 4 and m=0 to 2 and n=0 to 10. These may be lead(II)acetates, lead(IV)acetates as well as basic lead acetates, $Pb(O-CO-CH_3)_2 \cdot 3H_2O$ being particularly preferred and yielding particularly good results. Another preferred lead compound is $Pb(O-CO-CH_3)_4$, for instance.

Crystal water which may be present in the lead carboxylates offers the advantage that it may be used for the hydrolytic condensation. The lead carboxylates may either be added in stoichiometric amounts or in excess with the molecular proportion of lead being between 1 and 1.5 mol. Excessive lead offers the advantage that the loss of lead as a result of the PbO evaporation during the tempering process is compensated ab initio.

Polar solvents with complexing chelating properties are used to produce the solution containing components a), b) and c) and having a concentration which is at least 0.5 mols, based on the $Pb(Zr_xTi_{1-x})O_3$. To this end, glycol ethers, diols, polyvalent alcohols, amino alcohols, glycerin, hydroxythiols, aminothiols, dithiols, diamines or mixtures thereof are preferably used. 1.3-propanediol is particularly preferred.

Furthermore, 1 molar concentrations of this solution are preferred.

The solution may be produced, for instance, by bringing desired quantities of these components together, or by initially producing a solution of reduced concentration and by thereafter removing the solvent by conventional processes until the desired concentration has been reached. But it is also possible initially to produce a solution, to remove the solvent therefrom until a viscous residue remains which may thereafter be thinned by a desired quantity of the same or a different solvent.

Thereafter, at least 2.5 equivalents of water, based upon the $Pb(Zr_xTi_{1-x})O_3$, is added to the resulting solution consisting of components a), b) and c), for a hydrolytic condensation. At least 10 to 20 equivalents of water are preferred. The water may be added in steps or at once or in the presence of a solvent and/or of a condensation catalyst, as is customary for sol-gel processes of this type.

The water may be added as such or in a mixture of one or more organic solvents. Preferably such a solvent also has a certain polarity and complexing chelating properties. Such solvents have already been explained in detail in connection with the description of components a), b) and c). Especially preferred is the use of a mixture of water and one or more polar solvents with complexing and chelating properties, the polarity of which is less than the polarity of that solvent or solvent mixture which was used to produce the 0.5 molar solution, based on the $Pb(Zr_xTi_{1-x})O_3$, of components a), b) and c). If 1.3-propanediol, for instance, is used for producing the solution of components a), b) and c), a mixture of water and 2-methoxyethanol is particularly preferred for the hydrolysis.

Preferably, the hydrolytic condensation is carried out at temperatures between room temperature and the boiling point of the solvent. Lower and higher temperatures are possible as well.

Monolithic wet gels are obtained following the hydrolytic condensation. The wet gels are aged beyond their gel point. As a result, the gel skeleton is solidified by aging processes. The aging may be carried out, for instance, at room temperature or at higher temperatures, the aging time being, of course, a function of the aging temperature.

Because of the high boiling points of the solvents used, supercritical drying of the wet gel is not possible. It has surprisingly been found that the polar complexing and chelating solvents in the pores of the wet gel may be replaced by supercritically dryable solvents of low polarity. Suitable solvents of this kind are, e.g., ethanol or isopropanol or mixtures thereof. The exchange of solvents may be performed, for instance, simply by immersing the wet gel in this solvent mixture, leaving it there, and by changing the excess liquid several times until only small quantities of the original pore liquid may be detected in the excess.

If a mixture of isopropanol and water, for instance, is used as the hydrolytic solution, massive fissures and chips occur in the upper layers of the wet gels.

It has surprisingly been found that in the manner of the invention, the liquid in the pores of the wet gels may be exchanged without formation of any fissures.

The wet gel is dried under supercritical conditions after exchanging the liquid in the pores. For isopropanol, for instance, these are 236° C. and 4.76 Mpa. Surprisingly, in spite of linear shrinkage of 25 or 30%, stable, monolithic and highly porous aerogels are obtained. It has surprisingly been found that the material obtained immediately after supercritical drying already has a significant phase constancy of elementary lead which after heating to above 340° C., for instance, is converted to lead oxide. Following further temperature treatment monolithic highly porous lead titanate or lead zirconate-titanate aerogels are obtained.

It has surprisingly been found that lead titanate and lead zirconate-titanate aerogels may be transformed by temperature treatment into the perovskite phase without any fissure formation.

It is surprisingly possible, by the method in accordance with the invention, to obtain solutions with high lead concentrations which following hydrolytic condensation lead to gels of markedly increased solid contents and stable inorganic networks. By the method in accordance with the invention, stable, highly porous materials of lead titanate or lead zirconate-titanate stoichiometry which may be converted to the perovskite structure without destroying the monoliths. All components are easily commercially available, and the synthesis of the precursors as well as the hydrolysis and post-treatment steps require only a small expenditures in laboratory equipment. The method in accordance with the invention is, in fact, a one-pot reaction which need not be executed under a protective gas. All educts and intermediates may be stored almost indefinitely. Simply by simple isothermal tempering at 600° C. highly porous materials with crystalline structures of the kind required for piezoelectric applications may be realized. The liquid in the pores of wet gels produced in accordance with the invention may be exchanged, without fissure formation, against such solvents which permit supercritical drying to PT and PZT aerogels. The aerogels in accordance with the invention may be converted by tempering, by almost completely maintaining their porosity, into the crystalline structure required for piezo-ceramics. By modifying the conditions of aging and/or of the drying process a controlled setting of density and elasticity may be accomplished in keeping with any given application.

The piezo-active aerogels made by the method in accordance with the invention may be used, for instance, as ultrasonic transducers.

The invention will be explained in more detail on the basis of an example.

EXAMPLE 1 mol of lead acetate trihydrate is dissolved in 400 ml of 1.3-propanediol at 60° C. and added in drops into vigorously stirred 1 mol $Ti(AcAc)_2(O^iPr)_2$ solution (75%, Aldrich). The mixture is stirred for 4 to 6 hours at 150° C. before it is concentrated to a viscous residue at a 60° C. bath temperature under an oil pump vacuum. By replenishment with 1.3-propanediol to 1 liter, a 1 molar solution of the lead titanate precursor is obtained. If, however, an attempt is made to prepare a 1 molar precursor solution from the viscous residue by isopropanol instead of 1.3-propanediol, a lead-containing substance will precipitate. By mixing equal volumes of the 1.3-propanediol containing precursor solution and a mixture of 2-methoxyethanol and water, and storage at 50° C. monolithic wet gels are obtained within 48 hours, if 20 equivalents of water are added to the hydrolytic solution for each mol of lead titanate. After hydrolysis, the gels are stored at 50° C. for about one week so that the gel structure may be solidified by aging processes.

Direct supercritical drying of the wet gel is not possible because of the high boiling points of 1.3-propanediol (214° C.) and 2-methoxyethanol. To exchange the liquid in the pores, the resulting wet gel is immersed in isopropanol and the exchange liquid is repeatedly changed until only traces of the original solvent can be detected in the excess. The resulting wet gel is dried in isopropanol under supercritical conditions (236° C., 4.76 MPa). In spite of linear shrinkage of 25 to 30%, monolithic aerogels are obtained which in accordance with a chemical analysis have an equimolar ratio of lead and titanium. The material is blackened by pyrolytic reaction and displays the following properties:

| bulk density: | .60–.75 g cm$^{-3}$ | calculated by mass and weight; |
|---|---|---|
| skeleton density: | 4.8–6.3 g cm$^{-3}$ | He pycnometry; |
| spec. surface: | 40–70 m$^2$ g$^{-1}$ | BET measurements; |
| carbon content: | 2–6% | CHN analysis. |

Contrary to all expectations, the material obtained immediately after supercritical drying has a significant crystalline phase constancy of elementary lead which upon heating to 340° C. is converted into lead oxide. By isothermal temperature treatment for 1 hour at 600° C. in air, pieces of the material may at low shrinkage be converted as monoliths into tetragonal lead titanate. The calculated porosity of the end product exceeds 80%.

What is claimed is:

1. A method of making porous ceramics of a

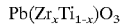

$Pb(Zr_xTi_{1-x})O_3$ compound, where x=0 to 0.9, comprising the steps of:
   preparing an at least 0.5 molar solution, based upon the $Pb(Zr_xTi_{1-x})O_3$, including
     a) at least one polar solvents having complexing and chelating properties;
     b) one or more of at least one of Pb(II) and Pb(IV) carboxylates selected from the group consisting of substituted, unsubstituted, monovalent, polyvalent, saturated, unsaturated, straight chain, cross-linked, cyclic and aromatic carboxylic and hydroxy carboxylic acids having 1 to 18 carbon atoms; and
     c) at least one compound of titanium and zirconium having the general formula I

M(OR)$_4$     (I)

where M is titanium or zirconium and the R groups are similar or different and represent at least one of straight chain, cross-linked and cyclic alkyl and alkenyl groups with 1 to 10 carbon atoms;
   carrying out a hydrolytic condensation by mixing the resulting solution with at least 2.5 equivalents of water, based on the $Pb(Zr_xTi_{1-x})O_3$;
   aging the resulting gel beyond its gel point;
   replacing the solvent in the pores of said gel by a non-chelating solvent which is supercritically dryable and having low polarity;
   drying the resulting gel under supercritical conditions; and
   tempering the resulting aerogel.

2. The method of claim 1, wherein said alkyl and alkenyl groups have at least one of carbonyl, ester and carboxyl function.

3. The method of claim 1, wherein the step of mixing said water with said resulting solution is carried out in the presence of at least one of a dissolving aid and catalyst.

4. The method of claim 1, wherein at least one of said OR groups of general formula I are selected from the group consisting of oxoesters, β-diketones, carboxylic acids, ketocarboxylic acids and ketoalcohols.

5. The method of claim 1, wherein said OR group of general formula I is acetyl acetone.

6. The method of claim 1, wherein said solvents having complexing and chelating properties are selected from the group consisting of glycol ethers, dials, polyvalent alcohols, amino alcohols, glycerine, hydroxythiols, aminothiols, dithiols, diamines and mixtures thereof.

7. The method of claim 1, wherein the hydolytic condensation comprises the step of adding a mixture of water and at least one polar solvent having complexing and chelating properties.

8. The method of claim 1, further including the step of replacing the polar complexing and chelating solvent in the pores of said gel by at least one of ethanol and isopropanol and a mixture thereof.

9. The method of claim 1, wherein said hydrolytic condensation is carried out by mixing 10 to 20 equivalents of water, based on the $Pb(Zr_xTi_{1-x})O_3$, to the resulting solution.

10. The method of claim 9, wherein said resulting solution and water are mixed in the presence of at least one of a dissolving aid and a catalyst.

11. The method of claim 1, wherein said hydrolytic condensation is carried out at a temperature between room temperature and the boiling point of the solvent.

12. The method of claim 1, wherein said hydrolytic condensation is performed by adding a mixture of water and at least one polar solvent having complexing and chelating properties, the polarity of said solvent being lower than the polarity of the solvent used for producing the at least 0.5 molar solution, based on the $Pb(Zr_xTi_{1-x})O_3$.

13. The method of claim 1, wherein an at least 1 molar solution, based on the Pb $(Zr_xTi_{1-x})O_3$, is prepared.

* * * * *